(12) United States Patent
Baker et al.

(10) Patent No.: US 8,593,113 B2
(45) Date of Patent: *Nov. 26, 2013

(54) SUPERCAPACITOR BACKUP POWER SUPPLY WITH BI-DIRECTIONAL POWER FLOW

(75) Inventors: Keith Baker, Belfountain (CA); Larry Forsythe, Milton (CA)

(73) Assignee: Psion Inc., Mississaugu (CA)

( * ) Notice: Subject to any disclaimer, the term of this patent is extended or adjusted under 35 U.S.C. 154(b) by 137 days.

This patent is subject to a terminal disclaimer.

(21) Appl. No.: 13/072,552

(22) Filed: Mar. 25, 2011

(65) Prior Publication Data

US 2011/0215644 A1    Sep. 8, 2011

Related U.S. Application Data

(63) Continuation of application No. 11/598,531, filed on Nov. 13, 2006, now Pat. No. 7,915,866.

(51) Int. Cl.
*H02J 7/00* (2006.01)

(52) U.S. Cl.
USPC .......................................... 320/166; 323/222

(58) Field of Classification Search
USPC ................... 320/166, 167; 323/222
See application file for complete search history.

(56) References Cited

U.S. PATENT DOCUMENTS

| | | | |
|---|---|---|---|
| 5,424,614 A * | 6/1995 | Maheshwari | 315/209 R |
| 5,852,358 A * | 12/1998 | Ehsani | 323/240 |
| 6,160,382 A | 12/2000 | Yoon et al. | |
| 6,166,528 A * | 12/2000 | Rossetti et al. | 323/283 |
| 6,628,107 B1 | 9/2003 | Bang et al. | |
| 6,717,388 B2 * | 4/2004 | Smidt et al. | 323/271 |
| 7,649,344 B2 | 1/2010 | Bang et al. | |

OTHER PUBLICATIONS

Non Final Office Action mailed Jan. 6, 2009 in counterpart U.S. Appl. No. 11/598,531, Keith Baker, filed Nov. 13, 2006.
Final Office Action mailed Aug. 7, 2009 in counterpart U.S. Appl. No. 11/598,531, Keith Baker, filed Nov. 13, 2006.
Non Final Office Action mailed Mar. 8, 2010 in counterpart U.S. Appl. No. 11/598,531, Keith Baker, filed Nov. 13, 2006.
Notice of Allowance mailed Nov. 19, 2010 in counterpart U.S. Appl. No. 11/598,531, Keith Baker, filed Nov. 13, 2006.
Supplemental Notice of Allowability mailed Mar. 4, 2011 in counterpart U.S. Appl. No. 11/598,531, Keith Baker, filed Nov. 13, 2006.
Supplemental Notice of Allowability mailed Dec. 2, 2010 in counterpart U.S. Appl. No. 11/598,531, Keith Baker, filed Nov. 13, 2006.
English Translation of First Office Action for countepart Chinese Patent Application No. 200710159693.9 mailed Jul. 2, 2011.
English Translation of Office Action for counterpart Chinese Patent Application No. 200710159693.9 mailed Mar. 22, 2012.
English Translation of Notice of Allowance for counterpart Chinese Patent Application No. 200710159693.9 mailed Sep. 7, 2012.
Office Action for Counterpart Canadian Patent Application No. 2567562 mailed on Jul. 17, 2008.
Notice of Allowance for Counterpart Canadian Patent Application No. 2567562 mailed on Jun. 25, 2009.

* cited by examiner

*Primary Examiner* — Samuel Berhanu
(74) *Attorney, Agent, or Firm* — Randi L. Karpinia

(57) ABSTRACT

A system for providing backup power supply to a device is provided. The system includes a supercapacitor and a single circuit for charging and discharging of a supercapacitor. The single circuit operates with an inductor to provide for charging and discharging of the supercapacitor.

15 Claims, 7 Drawing Sheets

SUPERCAPACITOR BACKUP POWER SUPPLY WITH BI-DIRECTIONAL POWER FLOW

FIELD OF INVENTION

The present invention relates to power supply technology and more particularly to a supercapacitor based system for backup power supply.

BACKGROUND OF THE INVENTION

Many digital systems require a backup power supply for instances where main power becomes unavailable. Typically this has been done using batteries, but with the development of very high value capacitors (supercapacitors) it is quite often preferable to replace a battery with a capacitor. This is done mainly for service reasons: supercapacitors can endure more charge/discharge cycles than rechargeable batteries, and have a longer useable life than batteries leading to reduced service needs for a given product requiring a backup mechanism.

Known backup power mechanisms using supercapacitors for energy storage comprise two separate circuits: a circuit to charge the supercapacitor when a main power supply is available, and a switching power supply running off the supercapacitor when the main power supply is unavailable.

A simple example of a backup power mechanism with separate charge and discharge circuits is presented in FIG. 1. When the main power supply (not shown) is available, Vcc is generated by this power supply. During this time, a switch 102 is closed allowing a supercapacitor 104 to charge via a current source 103. The current source 103 may include a resistor, active current source, switching supply or other mechanism. A switch 106 is open during charging. The switch 102 is modulated to maintain a fixed (maximum) voltage on the supercapacitor 104. This will generally be performed by a control mechanism (not shown).

When the main power source is lost, the switch 102 is opened and the switch 106 is modulated to transfer energy from the supercapacitor 104 to Vcc via an inductor 108 and a diode 110. Output filtering is performed by output capacitors of the main power supply (not shown). Thus there are separate charge and discharge circuits. This use of separate circuits for charge and discharge requires additional part count thereby adding cost, Printed Circuit Board (PCB) layout area and weight.

A higher efficiency can be achieved when the diode 110 has a switch across it to form a synchronous rectifier. A circuit having this additional component is shown in FIG. 2. A switch 202 is connected in parallel with the diode 110. However, the circuit of FIG. 2 has a separate charge and discharge circuit.

There are supercapacitor charging schemes of the art that only provide for simple charging mechanisms where the supercapacitor is placed directly across the voltage allowing a very large current at the start of charging.

There is therefore a need to provide a supercapacitor based backup power system that minimizes part count, provides efficient output voltage generation and provides controlled (the instantaneous current requirements of the voltage source are limited) and power-efficient charging of the supercapacitor.

SUMMARY OF THE INVENTION

The present invention generally relates to the charging and discharging of a supercapacitor that is used power supply backup situations.

It is an object of the invention to obviate or mitigate at least one of the drawbacks of prior art circuits used for the charging and discharging of a supercapacitor.

In accordance with an aspect of the invention there is provided a system for backup power supply. The system includes a supercapacitor, and a single circuit for charging and discharging of the supercapacitor. The single circuit includes a path having an inductor for operating in charging mode for the charging and in backup mode for the discharging.

In accordance with another aspect of the invention, there is provided a system for backup power supply. The system includes a supercapacitor, an inductor, a single circuit operating with the inductor to provide for charging and discharging of the supercapacitor, and a controller for monitoring and controlling the single circuit.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the present invention provide a backup power supply which is implemented by a single charge-discharge circuit for a supercapacitor. The circuit may have a reduced part count compared to circuits with separate charge and discharge circuitry. In the description below, the term "connect(ed)" may be used to indicate that two or more elements are directly or indirectly in contact with each other.

Figure 1:
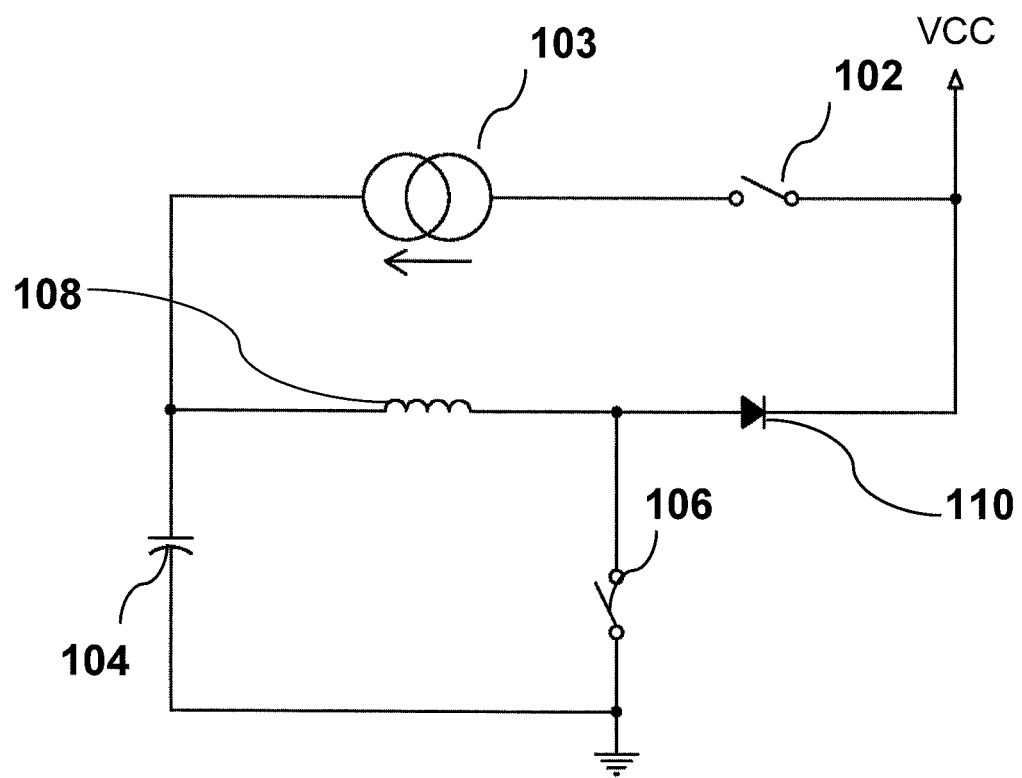
FIG. 1 is a schematic diagram illustrating a supercapacitor based backup power supply circuit of the prior art.
Figure 2:
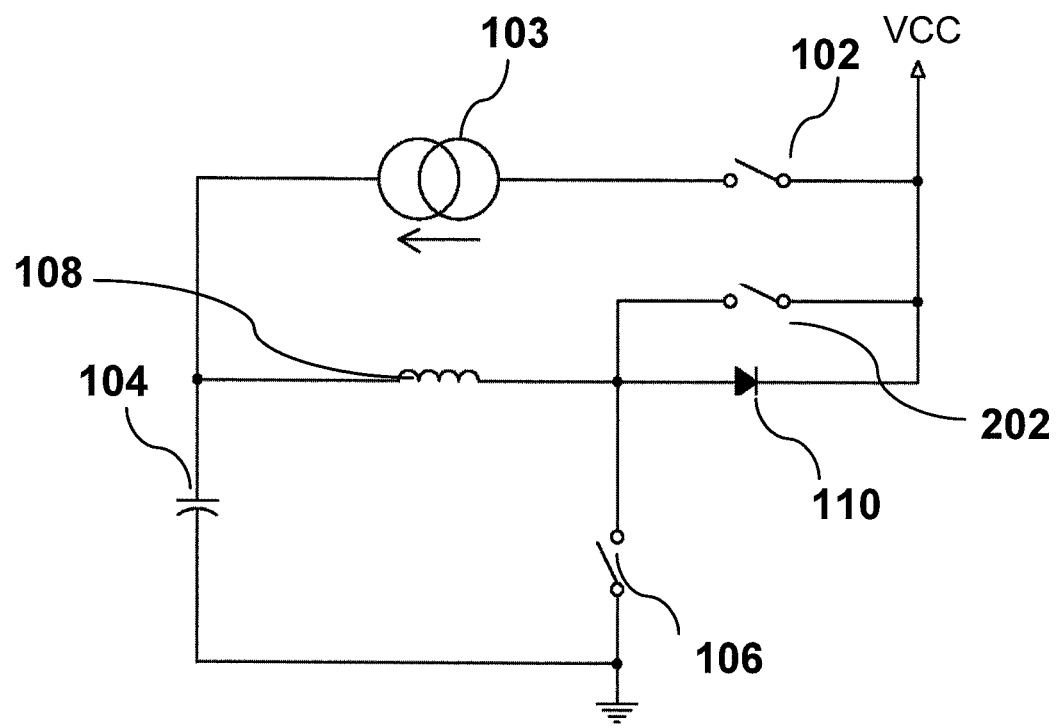
FIG. 2 is a schematic diagram illustrating another supercapacitor based backup power supply circuit.
Figure 3:
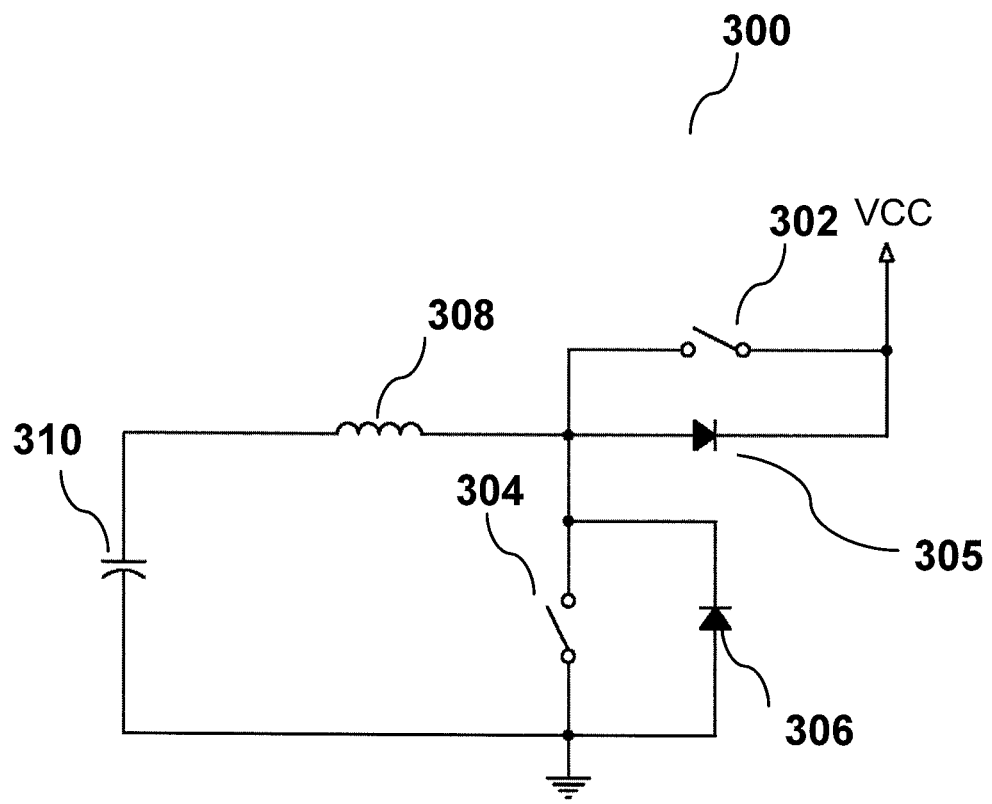
FIG. 3 is a schematic diagram illustrating a supercapacitor based backup power supply circuit in accordance with an embodiment of the present invention.

FIG. 3 illustrates a supercapacitor based backup power supply circuit in accordance with an embodiment of the present invention. The backup power supply circuit 300 of FIG. 3 includes switches 302 and 304, diodes 305 and 306, an inductor 308, and a supercapacitor 310. The switch 302 is connected in parallel with the diode 305. The switch 304 is connected in parallel with the diode 306. The inductor 308 and the supercapacitor 310 may be same or similar to the inductor 108 and the supercapacitor 104 of FIG. 2, respectively. It is noted that FIG. 3 is conceptual in the sense that further circuitry around that presented in FIG. 3 may be included.

The diode 306 acts as a so-called free-wheeling diode. The combination of the switch 302, the inductor 308 and the diode 306 provides a switching power supply or so-called buck converter that can be used to charge the supercapacitor 310. As this circuit 300 can be used for charging, a current source and its controlling switch (103 and 102 of FIG. 2) become redundant. Therefore the circuit 300 does not use the current source 103 and its switch 102 of FIG. 2. The circuit 300 provides for both charging and discharging of the supercapacitor 310 without a current source and its switch. In the circuit 300, magnetic element, i.e., inductor 308, operates in a bi-directional mode.

The circuit 300 is in charging mode when Vcc is generated by a main power supply (not shown). In charging mode, the switch 302 is modulated to charge the supercapacitor 310 to a desired level, i.e., power flows from Vcc to the supercapacitor 310. In charging mode, the switch 304 is generally left open at this time. It may however be closed during the freewheeling time of the diode 306 for improved efficiency. In this case the switch 304 behaves as a synchronous rectifier.

The circuit 300 is in backup (discharging) mode when the main power source that generates Vcc is detected as missing. In backup mode, the switch 304 is modulated such that power flows from the supercapacitor 310 to Vcc. In backup mode, the switch 302 is used as a synchronous rectifier and is closed during the fly-back time of the inductor 308.

Figure 4:
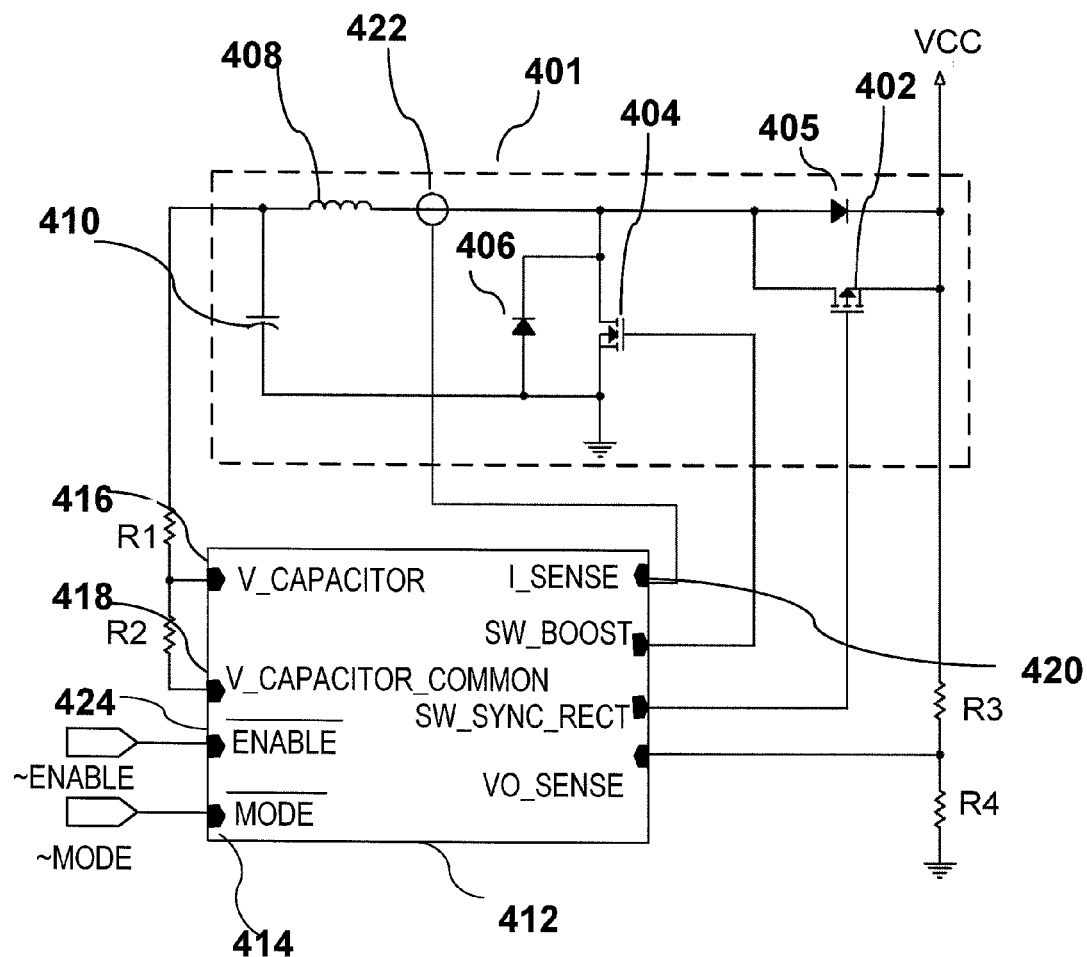
FIG. 4 is a schematic diagram illustrating a supercapacitor based backup power supply circuit in accordance with another embodiment of the present invention.
Figure 5:
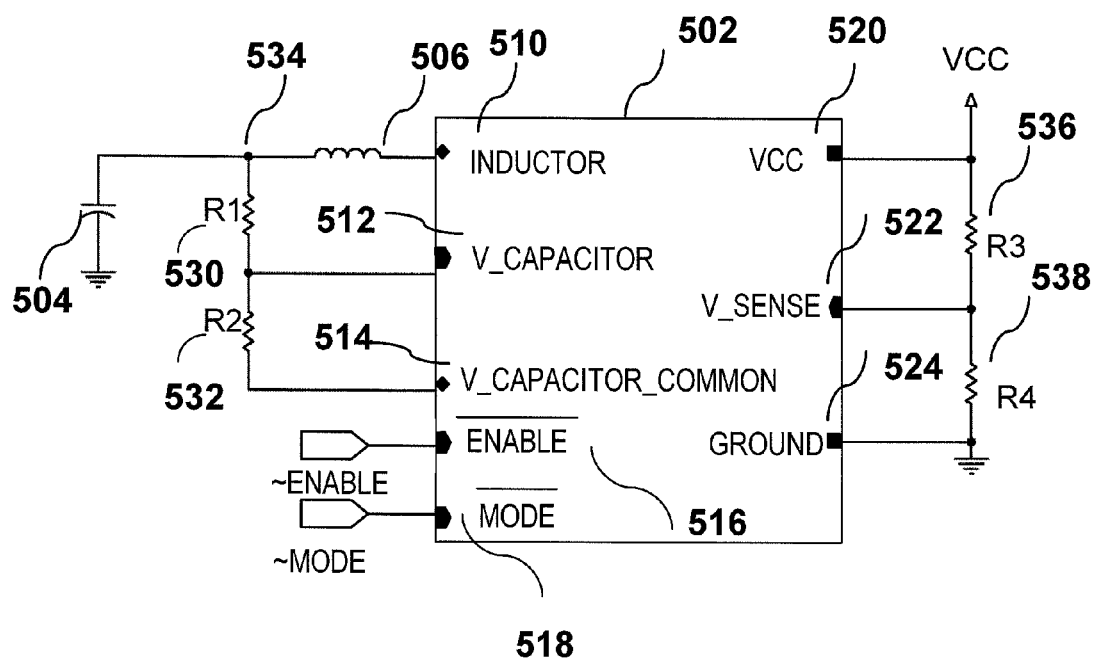
FIG. 5 is a schematic diagram illustrating a supercapacitor based backup power supply circuit in accordance with a further embodiment of the present invention.
Figure 6:
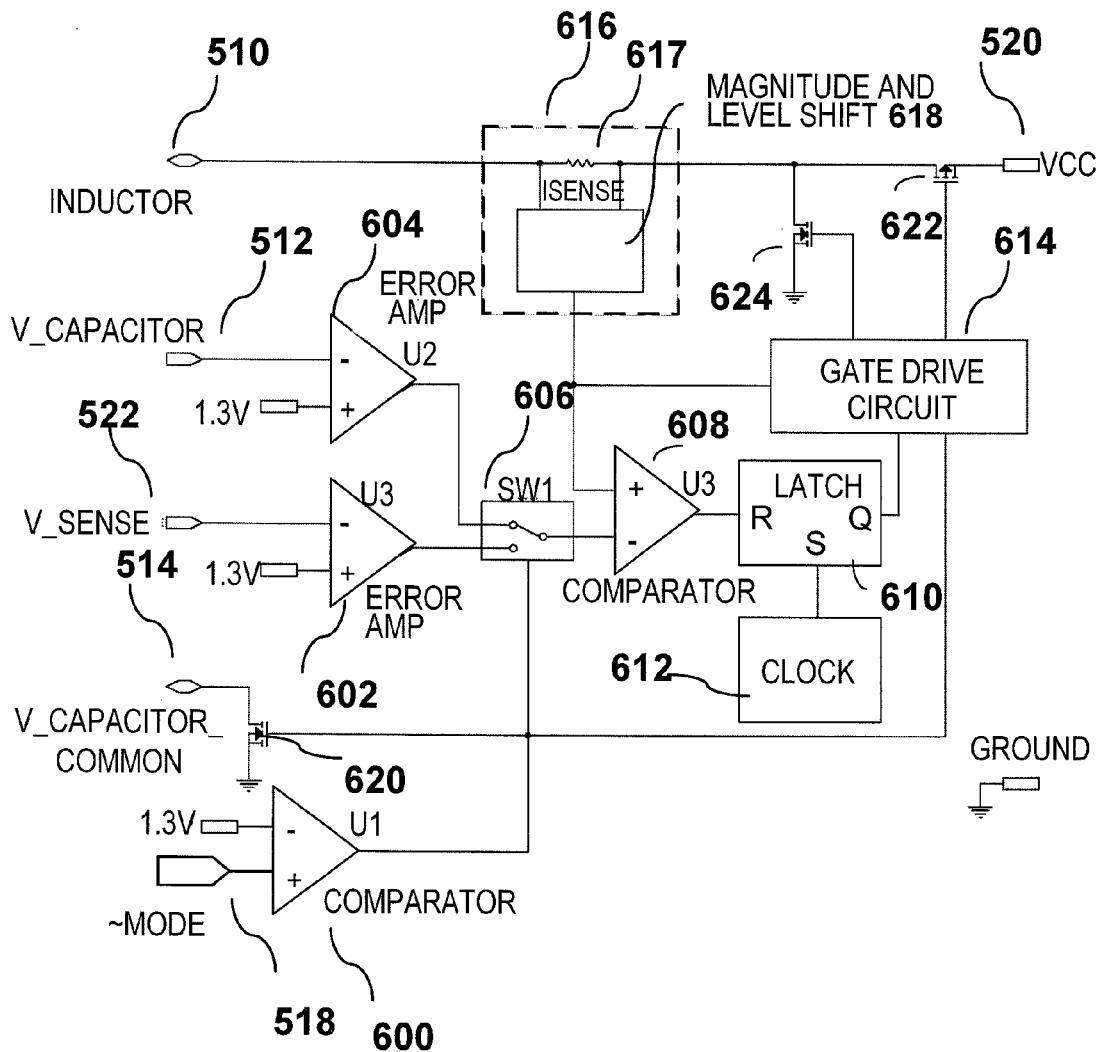
FIG. 6 is a schematic diagram illustrating an example of a control circuit in accordance with an embodiment of the present invention.

In an embodiment, a controller is provided to the circuit 300 to monitor the main power source, supercapacitor voltage, output voltage (Vcc), inductor current (if current mode control is to be implemented), or combinations thereof, and then control the operation of the charge-discharge circuit based on the monitored value(s) (e.g., FIGS. 4-6).

In one example, the controller monitors the main power source and enables the supercapacitor charging mechanism (charging mode) when the main power source is available. In charging mode, the controller monitors the voltage across the supercapacitor 310 and operates the switches 302 and 304 in conjunction with the inductor 308 such that a buck converter (with synchronous rectifier) is formed. In this case energy flows from Vcc to the supercapacitor.

When the main power source is lost, the controller then switches to the backup mode. In backup mode, the controller monitors the voltage Vcc and runs the switches 302 and 304 in conjunction with the inductor 308 such that a boost converter (with synchronous rectifier) is formed. In this case energy flows from the supercapacitor to Vcc.

In either charging or backup mode, the controller may implement the current mode control. The current mode control uses an inner control loop to limit the peak or average current in the inductor 308, which results in the apparent removal of the pole associated with the inductor 308 when compared to a voltage mode controlled switching mode power supply. This resulting reduced order transfer function allows for better dynamic response of the power supply, and may make the compensation of the power supply easier. For such control the controller includes a mechanism to monitor the current of the inductor 308 in the current control mode. The inherent control of inductor current from the current mode control works well with the concept of charging the capacitor at a fixed rate. The circuit 300 may employ a voltage mode control for controlling the output voltage.

The circuit 300 is appropriate for the configuration where the supply voltage, Vcc, is greater than or equal to the maximum allowable capacitor voltage. However, it is well understood by one skilled in the art that the circuit 300 can be restructured such that a Vcc lower than the maximum supercapacitor voltage can be supported. Thus a boost circuit to charge the supercapacitor, and a buck circuit to supply Vcc in backup is provided, i.e., a bi-directional power flow through one common mechanism.

FIG. 4 illustrates a supercapacitor based backup power supply circuit in accordance with a further embodiment of the present invention. The supercapacitor based backup power supply circuit 401 of FIG. 4 is similar to the circuit 300 of FIG. 3. The circuit 401 includes switches 402 and 404, diodes 405 and 406, inductor 408, and supercapacitor 410. The diodes 405 and 406 correspond to the diodes 305 and 306 of FIG. 3. The inductor 408 may be same or similar to the inductor 308 of FIG. 3. The supercapacitor 410 may be same or similar to the supercapacitor 310 of FIG. 3. The switches 402 and 404 correspond to the switches 302 and 304 of FIG. 3. However, in this embodiment the switch 402 and 404 are Metal-Oxide-Semiconductor Field-Effect Transistors (MOSFETs). In the description, the terms "switch 402 (404)" and "MOSFET 402 (404)" may be used interchangeably.

In one example, the diodes 405 and 406 may be intrinsic diodes of the MOSFETs 402 and 404, respectively. In another example, the diodes 405 and 406 may be external schottky diodes connected in parallel with the intrinsic diodes of the MOSFETs 402 and 404, respectively. The schottky diode may provide a current path during the time it takes for the corresponding MOSFET to fully turn on. The schottky diode has a lower forward voltage than the parallel diode that is intrinsic to the construction of the MOSFET, which is efficient for use in power rectification applications.

The diodes 405 and 406 and the switches 402 and 404 and an inductor current sensing mechanism may be integrated into an IC package (integrated circuit) with a controller 412. The controller 412 may be implemented in any appropriate fashion. The inductor 408 and the supercapacitor 410 may be outside of any integrated circuit.

In order for the controller 412 to provide the required functionality it receives as input and is responsive to various signals. Such signals according to an embodiment of the invention are presented in FIG. 4. A "~MODE" control signal 414 is used by the controller 412 to provide for automatic switchover between charging and backup modes. In one example, the "~MODE" signal 414 is an analogue input to a comparator (e.g., 600 of FIG. 6) referenced to a voltage compatible for TTL or some other logic level. This allows ~MODE 414 to be driven from another circuit or from a scaled version of the main input power source. In the simplest realization, a resistive divider may scale the main input voltage to the comparator input, and may be scaled to less than the minimum input voltage, allowing backup in the case of unexpected supply removal. A "V_CAPACITOR" signal 416 is a JFET input (low input current) and a "V_CAPACITOR_COMMON" signal 418 is high impedance when not sampling the supercapacitor voltage, i.e., when in backup mode. A "~ENABLE" signal 424 is a signal to enable the entire functionality of the device.

A "I_SENSE" signal 420 is a single input allowing a current input as is needed in current mode control. In this embodiment, the current through the inductor 408 is measured at a current sense 422. The current may in fact be measured in several places depending on the topology of circuit. The current sense mechanism of the controller 412 accepts bi-directional current flow assuming current mode control is used. In the embodiment, the circuit is operated at a high frequency allowing the use of a small inductor. For simple circuit realization, the internal reference voltage of the controller 412 may be less than both Vcc and the maximum voltage of the supercapacitor 410.

The circuit 401 is appropriate for the configuration where the supply voltage, Vcc, is greater than or equal to the maximum allowable capacitor voltage. In an alternative embodiment the Vcc is lower than the maximum allowable capacitor voltage. In this situation the topology of the charge-discharge circuit 401 of FIG. 4 is reversed so that a boost circuit charges the capacitor and a buck circuit produces Vcc from the capacitor voltage.

FIG. 5 illustrates a supercapacitor backup power supply circuit in accordance with a further embodiment of the present invention. The configuration presented in FIG. 5 is appropriate for a supercapacitor backup power supply with bi-directional power flow where Vcc is greater than the maximum supercapacitor voltage. The controller element of this circuit includes diodes, power supply switches for the charge-discharge mechanism, current sensing, voltage sensing, and circuits to support the operation of the dual mode power supply. The controller element may be implemented within an integrated circuit (referred to as integrated circuit 502). A supercapacitor 504 and an inductor 506 are external of the integrated circuit 502.

The supercapacitor 504 may be same or similar to the supercapacitor 310 of FIG. 3 or the supercapacitor 410 of FIG. 4. The inductor 506 may be similar to the inductor 308 of FIG. 3 or the inductor 408 of FIG. 4.

The circuit of FIG. 5 has resistor networks similar to those of FIG. 4. A resistor network having resistors 530 and 532 is provided between the integrated circuit 502 and a node 534 that is a connection node of the supercapacitor 504 and the inductor 506. A resistor network having resistors 536 and 538 is provided between Vcc and the integrated circuit 502.

In FIG. 5, only resistive elements in the feedback paths are shown, which set the DC potentials. The circuit of FIG. 5 includes two feedback paths, only one of which is activated, depending on whether the supercapacitor 504 is being charged (i.e., charging mode), or discharged (i.e., backup mode). Compensation may be achieved by the addition of capacitors to these resistors to provide spectral shaping in order to achieve stable operation of the circuit, in both charging and backup modes. It is understood by a person of ordinary skill in the art that more complex feedback mechanisms may be formed, depending on the desired operating characteristics of the circuit.

In FIG. 5, the integrated circuit 502 includes a plurality of pins for INDUCTOR signal 510, V_CAPACITOR signal 512, V_CAPACITOR COMMON signal 514, ~ENABLE signal 516, ~MODE signal 518, VCC signal 520, V_SENSE signal 522 and GROUND signal 524. The INDUCTOR signal 510, the V_CAPACITOR signal 512, the V_CAPACITOR_COMMON signal 514, the ~ENABLE signal 516, the ~MODE signal 518, and the V_SENSE signal 522 may be similar to the I_SENSE signal 420, the V_CAPACITOR signal 418, the V_CAPACITOR_COMMON signal 418, the ~ENABLE signal 424, the ~MODE signal 414, and the V0_SENSE signal in FIG. 4, respectively.

FIG. 6 illustrates an example of a control circuit in accordance with an embodiment of the present invention. The pin-out of the circuit of FIG. 6 is similar to the controller of FIG. 5. In FIG. 6, signals associated with the integrated circuit 502 other than the ~ENABLE signal 516 are shown as examples. The circuit of FIG. 6 is a basic current mode control and, for simplicity, compensation (feedback) elements of the control loops are not shown.

The ~MODE input 518 is used to define the operating mode of the circuit (charging or backup) and select the source of the voltage error amplifier (i.e., 602 or 604) into the inner current loop through a switch 606. A comparator 600 compares the ~MODE input 518 with a certain voltage and operates the switch 606. A comparator 608 compares the output of the switch 606 and the output of an "ISENSE" circuit 616.

The circuit 616 includes a resistor 617 and a magnitude and level shift circuit 618. The circuit 616 measures the current flowing through the inductor connected at the INDUCTOR node 510. In this embodiment, this measurement is a high-side measurement, and the sensing element is not referred to ground. The circuit 616 thus includes a mechanism to transmit the measured value to the ground-referenced comparator 608 in order to implement current mode control. The magnitude of the current flow operates the comparator 608. When the inductor current hits a threshold, e.g., its peak current for the current mode, the current mode is activated.

A latch 610 includes "S" node connected to a clock circuit 612, "R" node connected to the output of the comparator 608, and "Q" node connected to a gate drive circuit 614. The gate drive circuit 614 selects the correct switch operation for the operating mode (charging or backup), including operation of the synchronous rectifier. In FIG. 6, the gate drive circuit 614 drives switches 620, 622 and 624.

The switch 620 is turned on during the supercapacitor-charging mode. In backup mode, the switch 620 is turned off so the resistor network with resistors 530 and 532 of FIG. 5 does not bleed off energy in order to maximize the backup time available. Granted the power bled off may tend to be small, and thus the switch 620 may be eliminated at the expense of slightly reduced backup time.

The nature of the ISENSE circuitry (616, 618) depends on how the circuit is constructed. A current transformer is the simplest mechanism if building the circuit using discrete pans. For silicon implementations, techniques to do high-side current measurements are available to IC designers.

In the above embodiments, the main power supply has sufficient hold-up time such that the backup supply (i.e., the supercapacitor 310 of FIG. 3 or 410 of FIG. 4) can detect the missing input power and enter the backup mode from the charging mode.

In a further embodiment, the intrinsic diodes of the MOSFETs may be used in lieu of synchronous rectification.

In a further embodiment, additional inputs may be provided to set the peak inductor current for charging and discharging the supercapacitor, and for compensation of the control loop(s).

Figure 7:
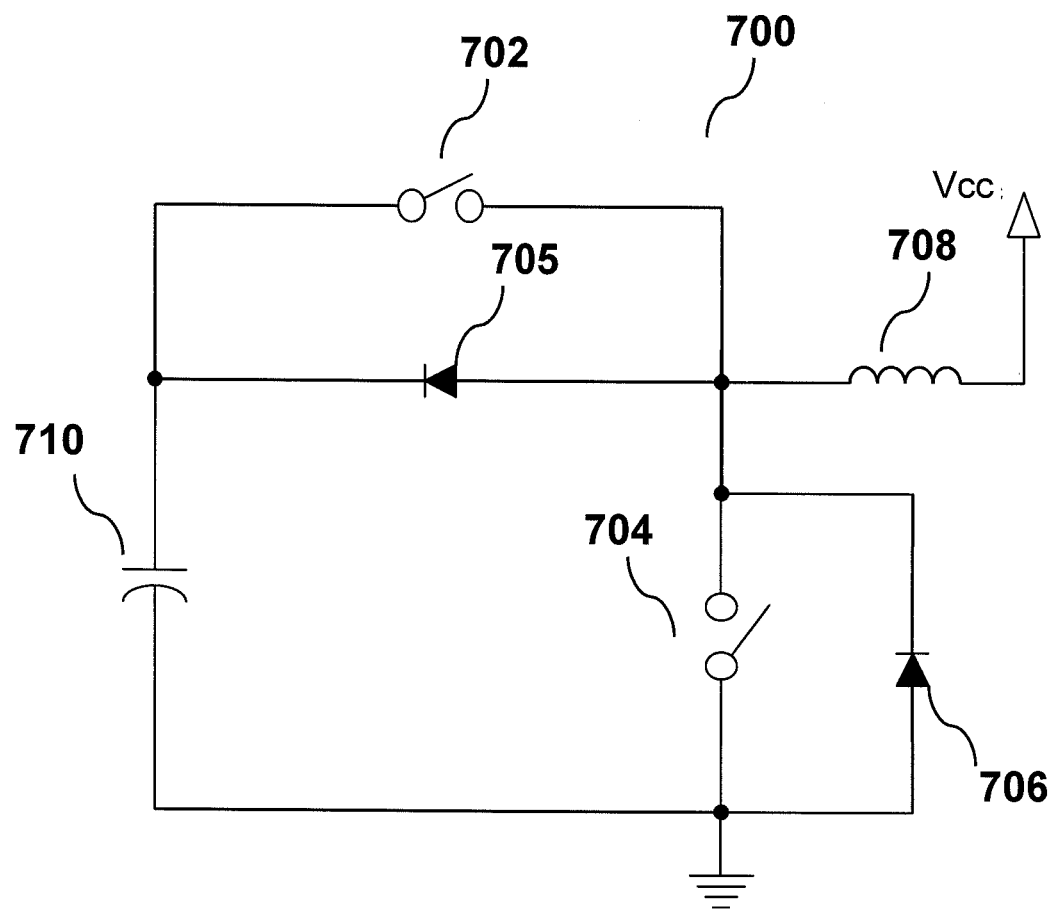
FIG. 7 is a schematic diagram illustrating a supercapacitor based backup power supply circuit in accordance with a further embodiment of the present invention.

FIG. 7 illustrates a supercapacitor based backup power supply circuit in accordance with a further embodiment of the present invention. The backup power supply circuit 700 of FIG. 7 is suitable for the configuration where the supply voltage, Vcc, is less than or equal to the maximum allowable capacitor voltage.

The supply circuit 700 includes switches 702 and 704, diodes 705 and 706, an inductor 708, and a supercapacitor 710. The switch 702 is connected in parallel with the diode 705. The switch 704 is connected in parallel with the diode 706. The inductor 708 and the supercapacitor 710 may be same or similar to the inductor 308 and the supercapacitor 304 of FIG. 3, respectively. In the backup power supply circuit 700, the switch 702 and the diode 705 are provided between the inductor 708 and the supercapacitor 710. The inductor 708 is connected to Vcc node.

In charging mode, the switch 704 is a power switch for the boosting and the switch 702 acts as a synchronous rectifier. In backup mode, the switch 702 is a power switch 702 is a power switch for the bucking and the switch 704 acts as a synchronous rectifier.

It will be appreciated by a person of ordinary skill in the art that the topology of the based backup power supply circuit is not limited to those of FIGS. 3, 4 and 7 and other topologies can be envisioned.

The present invention has been described with regard to one or more embodiments. However, it will be apparent to persons skilled in the art that a number of variations and modifications can be made without departing from the scope of the invention as defined in the claims.

What is claimed is:

1. A system for backup power supply, the system comprising:
    a backup power supply circuit comprising:
        a supercapacitor for backing up a potential node;
        an inductor coupled between a first terminal of the supercapacitor and the potential node, the inductor operating in a bi-directional mode to charge and discharge the supercapacitor;
        a first switch connected in a first parallel circuit with a first diode, the first parallel circuit coupled between the inductor and the potential node; and
        a second switch connected in a second parallel circuit with a second diode, the second parallel circuit coupled between the inductor and a second terminal of the supercapacitor, the first switch being used to modulate flow of current from a power source to the supercapacitor via the inductor when the power source is available at the potential node, and the second switch being used to modulate flow of current from the supercapacitor to the potential node via the inductor when the power source is lost at the potential node.

2. The system according to claim 1, wherein the first diode is coupled in parallel to the first switch such that the first diode is reverse biased when the power source is available at the potential node and forward biased when the power source is lost at the potential node.

3. The system according to claim 1, wherein the first diode is coupled in parallel to the first switch such that the first diode is forward biased when the power source is available at the potential node and reverse biased when the power source is lost at the potential node.

4. The system according to claim 1, wherein the first diode is an intrinsic diode of the Metal-Oxide-Semiconductor Field-Effect Transistor (MOSFET).

5. The system according to claim 1, wherein the first diode is a schottky diode.

6. The system according to claim 1, wherein the second diode is coupled in parallel to the second switch such that the second diode is reverse biased when the power source is available at the potential node and forward biased when the power source is lost at the potential node.

7. The system according to claim 1, wherein the second diode is an intrinsic diode of the MOSFET.

8. The system according to claim 1, wherein the second diode is a schottky diode.

9. The system according to claim 1, wherein at least one of the first switch and the second switch is a MOSFET.

10. The system according to claim 1, the backup power supply circuit further comprising a controller for operating the first switch and the second switch.

11. The system according to claim 10, wherein the controller comprises a charging mode for charging the supercapacitor using the first switch, and a backup mode for discharging the supercapacitor using the second switch.

12. The system according to claim 10, wherein the controller comprises a current monitor for monitoring the inductor current.

13. The system according to claim 10, wherein the controller comprises a voltage monitor for monitoring the voltage level at the potential node.

14. The system according to claim 10, wherein the controller operates the first switch and the second switch to form a buck converter with a synchronous rectifier.

15. The system according to claim 10, wherein the controller operates the first switch and the second switch to form a boost converter with a synchronous rectifier.

\* \* \* \* \*